United States Patent
Olszewski

(10) Patent No.: US 9,499,283 B1
(45) Date of Patent: Nov. 22, 2016

(54) FREEPLAY MEASUREMENT DEVICE

(71) Applicant: Anthony Olszewski, Leonardtown, MD (US)

(72) Inventor: Anthony Olszewski, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 51 days.

(21) Appl. No.: 14/739,244

(22) Filed: Jun. 15, 2015

(51) Int. Cl.
*G01N 3/20* (2006.01)
*B64F 5/00* (2006.01)
*G01L 5/22* (2006.01)
*G01B 21/16* (2006.01)
*B64C 13/28* (2006.01)

(52) U.S. Cl.
CPC ............. *B64F 5/0045* (2013.01); *G01L 5/22* (2013.01); *B64C 13/28* (2013.01); *G01B 21/16* (2013.01)

(58) Field of Classification Search
CPC ....... B64F 5/0045; G01L 5/22; G01B 21/16; B64C 13/28
USPC .................. 73/802, 788, 852, 853; 701/3, 4
See application file for complete search history.

(56) References Cited

U.S. PATENT DOCUMENTS

| | | | |
|---|---|---|---|
| 7,933,691 B2 * | 4/2011 | Pitt ....................... | B64F 5/0045 701/3 |
| 8,032,269 B2 * | 10/2011 | Cherepinsky ......... | B64C 27/006 340/963 |
| 8,727,272 B2 * | 5/2014 | Kuhlmann .............. | G01M 9/04 244/212 |
| 9,067,673 B2 * | 6/2015 | Alonso Gago ....... | B64F 5/0045 |
| 2007/0173988 A1 * | 7/2007 | Pitt ....................... | B64F 5/0045 701/10 |
| 2009/0166475 A1 * | 7/2009 | Binder ..................... | B64C 9/02 244/131 |
| 2016/0041050 A1 * | 2/2016 | Vera ......................... | G01L 5/22 73/788 |

* cited by examiner

*Primary Examiner* — Lisa Caputo
*Assistant Examiner* — Jonathan Dunlap
(74) *Attorney, Agent, or Firm* — Mark O. Glut; NAWCAD

(57) ABSTRACT

A freeplay measurement device for measuring freeplay in a ruddervator includes a forward horseshoe assembly, an aft horseshoe assembly, a L-shaped locator, a connecting assembly, a load applicator, and a measuring device. The forward horseshoe assembly forms a half of an ellipse that can slip on the forward half of the tail. The aft horseshoe assembly forms a half of an ellipse that can slip on the aft half of the tail and ruddervator. The L-shaped locator is for aligning the forward horseshoe assembly on the tail and perpendicularly extends from the forward horseshoe assembly. The connecting assembly connects the forward horseshoe assembly and the aft horseshoe assembly when each is placed over the tail and the ruddervator. The load applicator is for applying loads on the ruddervator. The measuring device is for measuring the deflections of the ruddervator being tested, and is attached to the forward horseshoe assembly.

1 Claim, 4 Drawing Sheets

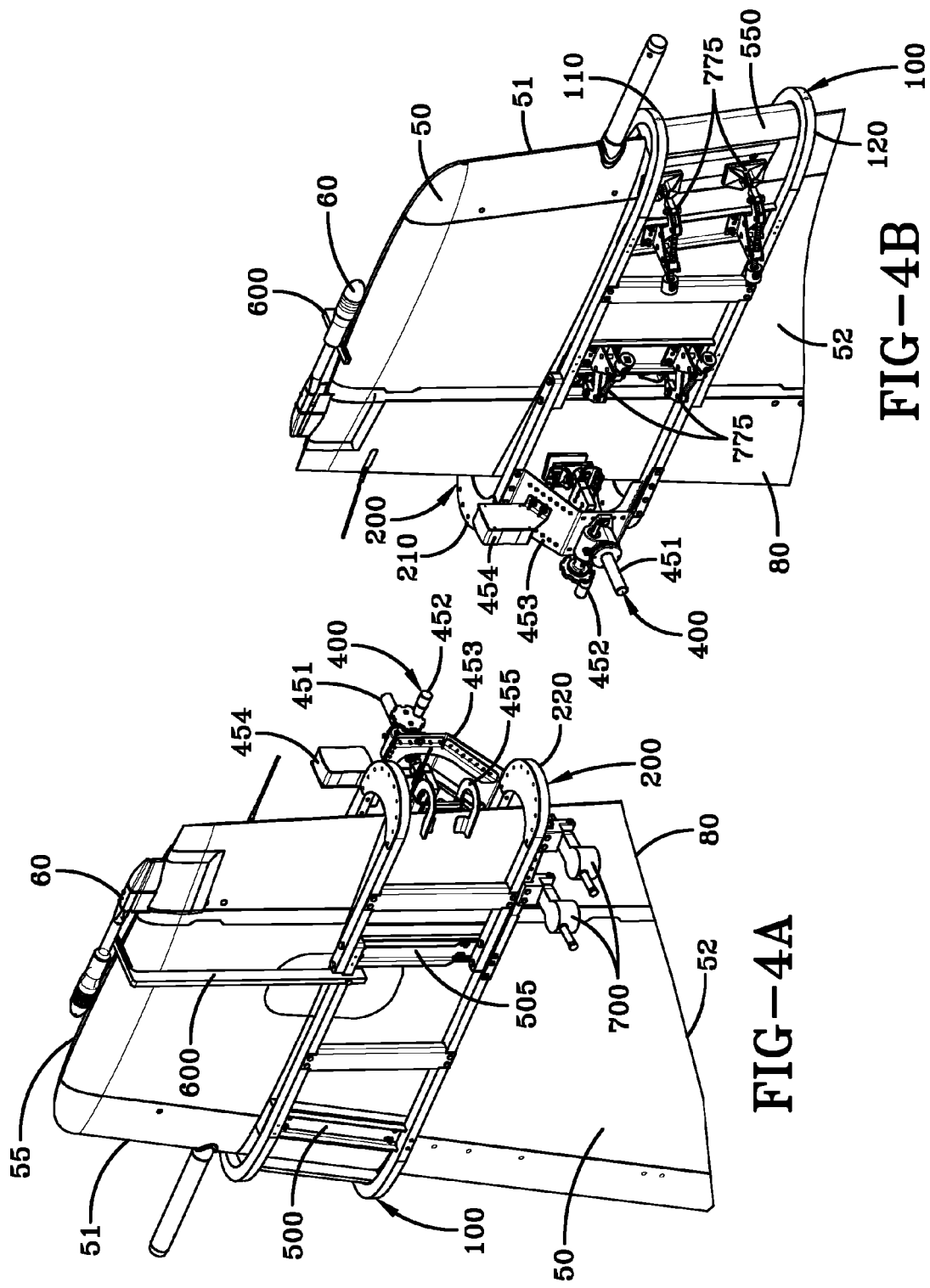

US 9,499,283 B1

FREEPLAY MEASUREMENT DEVICE

STATEMENT OF GOVERNMENT INTEREST

The invention described herein may be manufactured and used by or for the Government of the United States of America for governmental purposes without payment of any royalties thereon or therefor.

BACKGROUND

Freeplay can be defined, but without limitation, as the positional or rotational variation in mechanical parts. All aircraft include movable control surfaces for directional control during flight. Control surfaces, which are movable, include, but without limitation, the rudder, the aileron, the elevator, and the all-moveable horizontal tail of an aircraft. These control surfaces, particularly those operated in a military environment must be monitored for the freeplay of the control system. Excessive freeplay can result in flutter, vibrations, fatigue, divergence, or other instabilities. Historically, freeplay testing involves using complex ground fixtures. This testing is time consuming, requires a large team, and is very expensive.

Freeplay is typically tested by applying a known load to the control surface and measuring the corresponding deflection. This is repeated over numerous different loads (both positive and negative) for a minimum of three cycles. For example, a rotational variable differential transformer is used to measure rotation between a rudder and a tail of an aircraft, while a test hydraulic actuator and a load cell are used to record the load. Such setups are labor intensive and take a significant amount of time.

The latest United States Navy program requires that a freeplay test be performed after every flight. This adds excessive cost and time to aircraft maintenance. Therefore, an alternative method to test freeplay of control surfaces is needed. In particular, there is a need to test the free play of a ruddervator. A ruddervator may be defined, but without limitation, as a pair of control surfaces on a v-tail design that perform the function of both a rudder and an elevator.

SUMMARY

The present invention is directed to a system with the needs enumerated above and below.

The present invention is directed to a freeplay measurement device for measuring freeplay in a ruddervator. The measurement device includes a forward horseshoe assembly, an aft horseshoe assembly, a L-shaped locator, a connecting assembly, a load applicator, and a measuring device. The forward horseshoe assembly forms a half of an ellipse that can slip on the forward half of the tail. The aft horseshoe assembly forms a half of an ellipse that can slip on the aft half of the tail and ruddervator. The L-shaped locator is for aligning the forward horseshoe assembly on the tail and perpendicularly extends from the forward horseshoe assembly. The connecting assembly connects the forward horseshoe assembly and the aft horseshoe assembly when each is placed over the tail and the ruddervator. The load applicator is for applying loads on the ruddervator. The measuring device is for measuring the deflections of the ruddervator being tested, and is attached to the forward horseshoe assembly.

It is a feature of the present invention to provide a freeplay measurement device that is easy to use and is inexpensive.

It is a feature of the present invention to provide a freeplay measurement device that can measure freeplay quickly, and utilize less than two people.

It is a feature of the present invention to provide a freeplay measurement device that does not require use of hydraulics or complex computer programs.

DRAWINGS

These and other features, aspects and advantages of the present invention will become better understood with reference to the following description and appended claims, and accompanying drawings wherein:

FIGS. 4a and 4b are perspective views of the freeplay measurement device in operation.

DESCRIPTION

Figure 1:
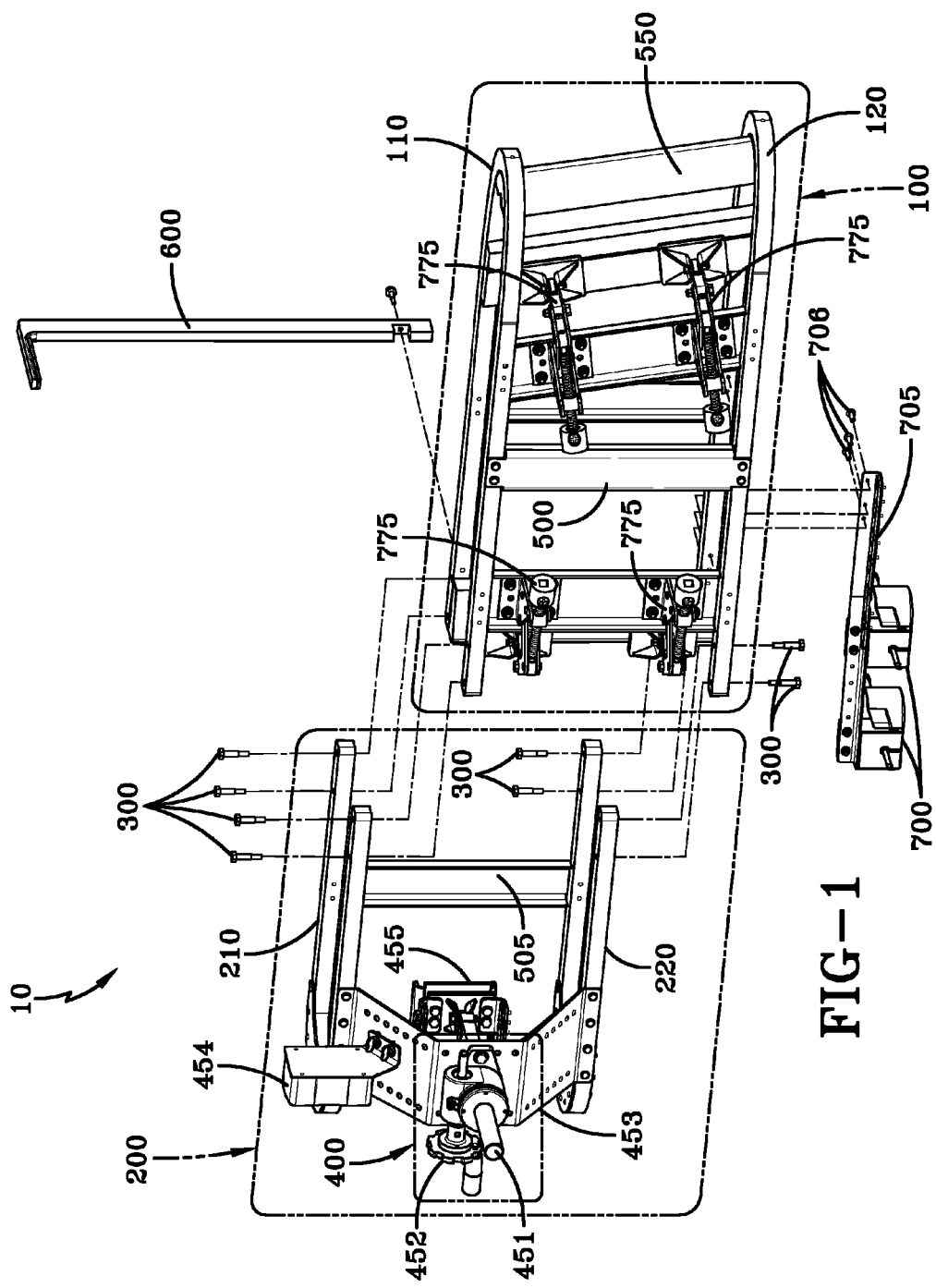
FIG. 1 is an exploded side perspective view of the freeplay measurement device.

The preferred embodiments of the present invention are illustrated by way of example below and in FIGS. 1-4. As shown in FIGS. 4a and 4b, a typical aircraft has a tail 50 with a forward half 51 and an aft half 52. An aircraft may also have a ruddervator 80 located at the aft half 52 of the tail 50. As shown in FIG. 1, a freeplay measurement device 10 for measuring freeplay in a ruddervator 80 of an aircraft comprises of a forward horseshoe assembly 100, an aft horseshoe assembly 200, a L-shaped locator 600, a connecting assembly 300, a load applicator 400, and a measuring device 700. The forward horseshoe assembly 100 has a first forward u-shaped bracket 110, a second forward u-shaped bracket 120, and a plurality of forward support braces 500. The plurality of forward support braces 500 connect the first forward u-shaped bracket 110 and the second forward u-shaped bracket 120 such that the first forward u-shaped bracket 110 and the second forward u-shaped bracket 120 form a half of an ellipse that can slip on the forward half 51 of the tail 50. The forward part of the forward horseshoe assembly 100 may include a forward support brace 550 that includes a polycarbonate contact surface. The forward support brace 550 connects the first forward u-shaped bracket 110 and the second forward u-shaped bracket 120 to ensure proper positioning on the leading edge of the tail 50 being tested. The aft horseshoe assembly 200 has a first aft u-shaped bracket 210, a second aft u-shaped bracket 220, and at least one aft support brace 505. The aft support brace 505 connects the first aft u-shaped bracket 210 and the second aft u-shaped bracket 220 such that the first aft u-shaped bracket 210 and the second aft u-shaped bracket 220 form a half of an ellipse that can slip on the aft half 52 of the tail 50 and the ruddervator 80. The L-shaped locator 600 is for vertically locating and aligning the forward horseshoe assembly 100 on the tail 50. The locator 600 perpendicularly extends from the first forward u-shaped bracket 110. The connecting assembly 300 can connect the forward horseshoe assembly 100 and the aft horseshoe assembly 200 when each is placed over the tail 50 and the ruddervator 80. The load applicator 400 is for applying loads on the ruddervator 80, and the load applicator 400 is attached to the aft horseshoe assembly 200. The measuring device 700 is for measuring the deflections of the ruddervator 80 being tested, and is attached to the forward horseshoe assembly 100 (particularly the second forward u-shaped bracket 120).

Figure 2:
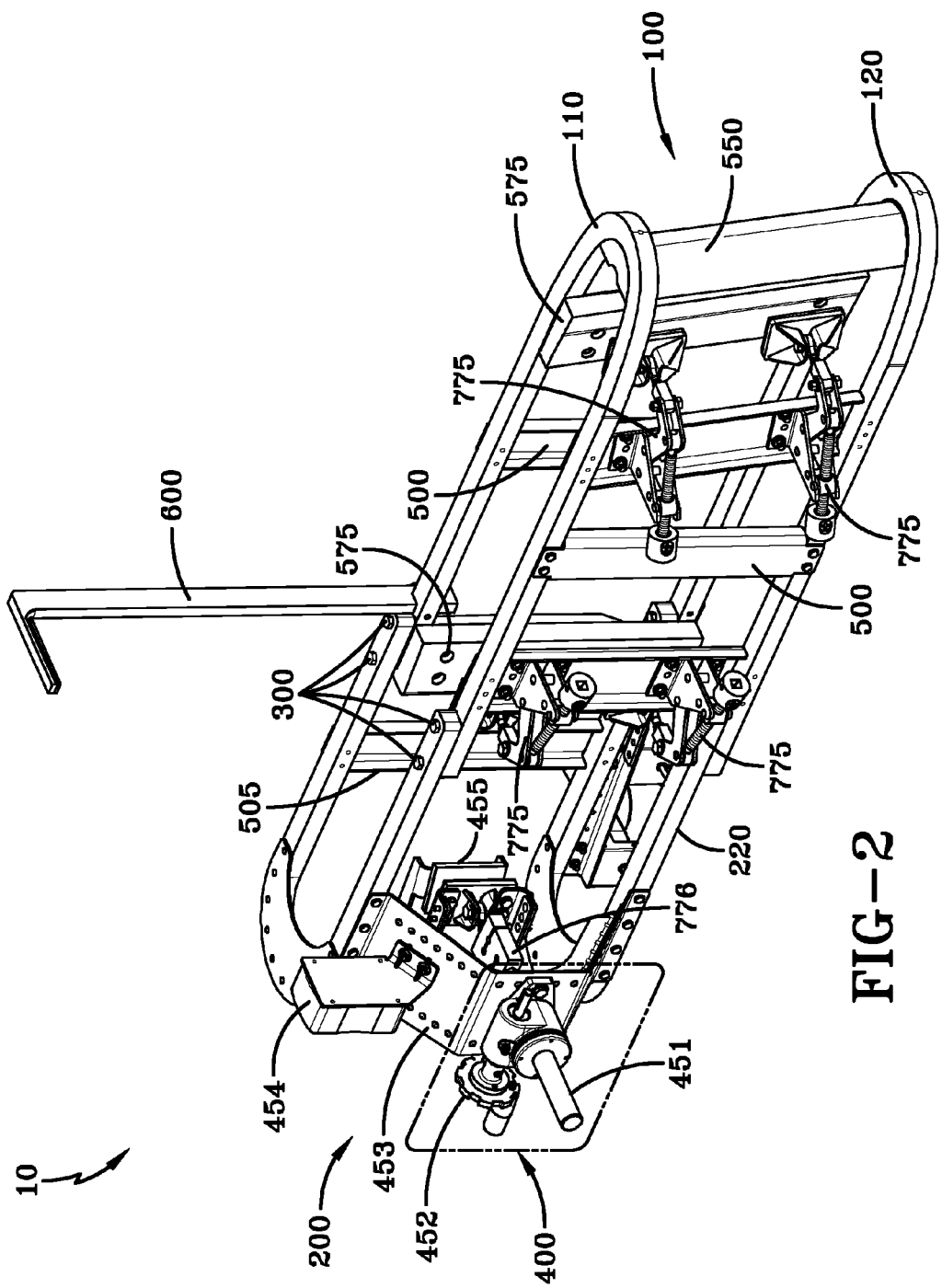
FIG. 2 is a side perspective view of the freeplay measurement device.
Figure 3:
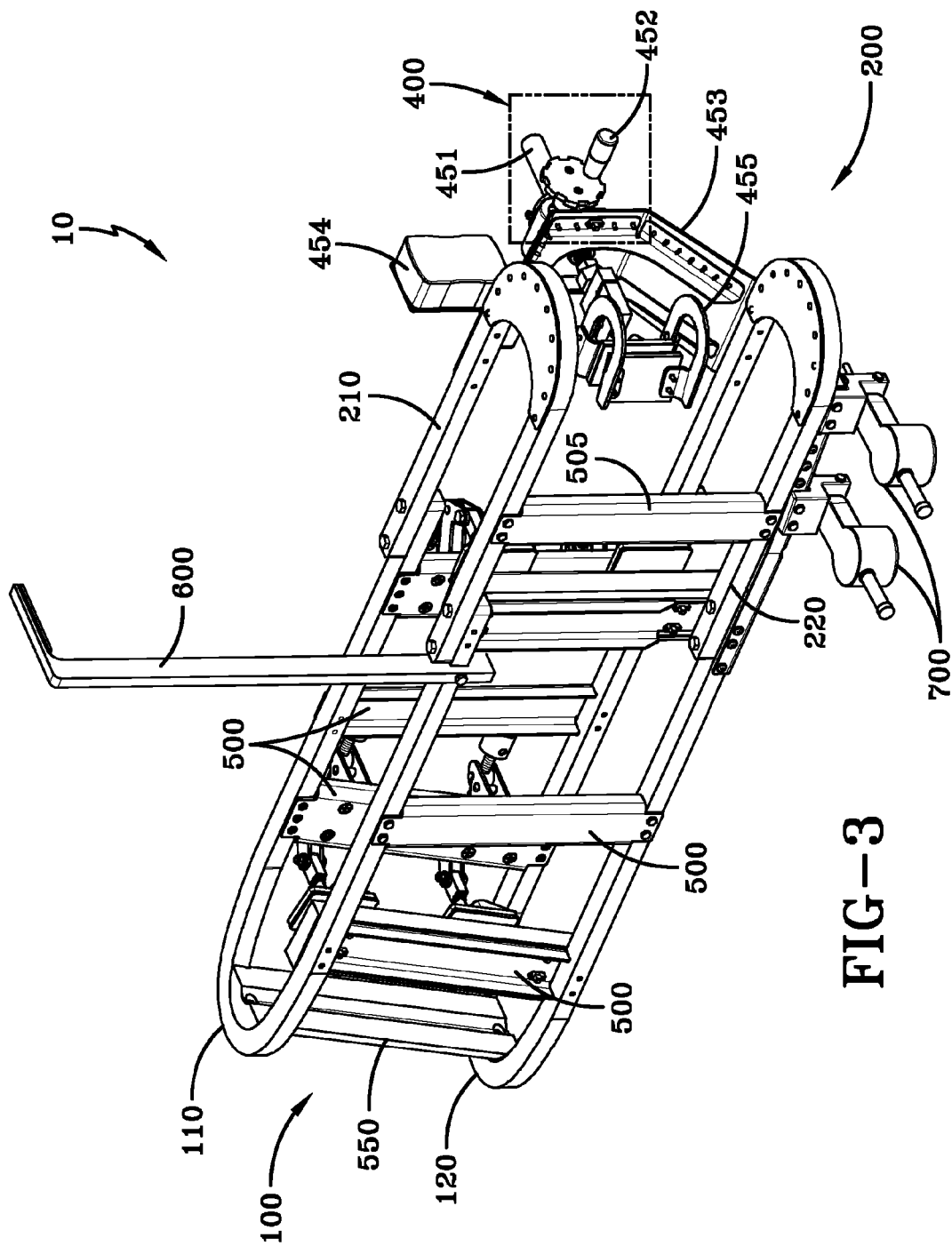
FIG. 3 is another perspective view of the freeplay measurement device.

As seen in FIGS. 1 and 2, in the preferred embodiment, the load applicator 400 can be a machine screw jack apparatus with a jack screw 451 and a load handle 452 for increasing or decreasing the load. However, any type of load applicator that is practicable can be utilized. The load applicator (or machine screw jack apparatus) 400 may be attached to the aft horseshoe assembly 200 (particularly to both the first aft u-shaped bracket 210 and the second aft u-shaped bracket 220) via a jack mount assembly 453. The jack mount assembly 453 may be a bracket that connects the two aft u-shaped brackets 210, 220 and has an area for attaching the load applicator 400. The load applicator 400 can include a ruddervator bracket 455 that communicates with the ruddervator 80 being tested (via a load indicator gauge 776) such that load is applied to the ruddervator 80. The load applicator 400 may also include a digital load indicator 454 which indicates the load being put on the ruddervator 80.

The freeplay measuring device 10 may also include at least one clamp assembly 775. The clamp assembly 775 is at least one clamp attached to a forward support brace 500 that secures the device 10 to the tail 50 and the ruddervator 80. Two of the support braces 500 opposite the two clamp assemblies 775 have a polycarbonate contact surface 575 attached in such a way as to provide a sufficient clamp force from the clamp assemblies 775 and so that the tail 50 being tested is not damaged.

As seen in FIG. 1, the measuring device 700 may be two id-c indicators that are attached to the forward horseshoe assembly 100 via a measuring device bracket 705 and can be connected to the forward horseshoe assembly 100 via measuring device screws 706.

Typically, a tail 50 includes a tip 55 and a mass balance 60. In the preferred operation, as seen in FIGS. 4A and 4B, the forward horseshoe assembly 100 is positioned until the L-shaped locator 600 corresponds with the tip 55 of the tail 50 and is positioned under the mass balance 60 of the tail 50. The aft horseshoe assembly 200 is slipped over the back end of the ruddervator 80, aligned with the forward horseshoe assembly 100, and the ruddervator bracket 455 is aligned with the ruddervator 80. In other embodiments, there may be multiple ruddervator brackets 455 for equal distribution of load on the ruddervator 80. Once each horseshoe assembly 100, 200 is positioned over the tail 50 and the ruddervator 80, the aft horseshoe assembly 200 is attached to the forward horseshoe assembly 100 using the connecting assembly 300. As shown in FIGS. 1 and 2, the connecting assembly 300 may be eight connecting assembly screws. However, any type of connecting assembly that is practicable may be utilized. The clamp assembly 775 is then engaged in order to secure the device 10 to the tail 50 and the ruddervator 80. The measuring device 700 (which includes two dial indicators) is then attached to the forward horseshoe assembly 100 using the measuring device bracket 705 and three measuring device screws 706. The load applicator 400 is then engaged and a load is applied to the ruddervator 80. The load handle 452 is turned until the desired load is achieved by reading the digital load gage indicator 454. The corresponding deflections, as observed on the two dial indicators are recorded with the load. This process is done in increments of 10% of the maximum desired load until 100% is achieved. Then the load handle 452 is turned in the opposite direction such as to incrementally unload the control surface. This is done in 10% increments until the maximum negative load is achieved. For each step the load and corresponding deflections are recorded. The load handle 452 is then turned in the original direction in increments of 10% until zero load is achieved all the while recording load and deflections. This process is repeated a minimum of three times to ensure repeatability.

In the description of the present invention, the invention will be discussed in a military aircraft environment; however, this invention can be utilized for any type of application that requires use of a freeplay measurement device.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained, herein.

What is claimed is:

1. A freeplay measurement device for measuring freeplay in a ruddervator of an aircraft, the aircraft having a tail, the ruddervator attached to the tail, the tail having a forward half and an aft half, the device comprising:
a forward horseshoe assembly comprising a first forward u-shaped bracket, a second forward u-shaped bracket, and at least one forward support brace, the at least one forward support brace connecting the first forward u-shaped bracket and the second forward u-shaped bracket such that the first forward u-shaped bracket and the second forward u-shaped bracket form a half of an ellipse that can slip on the forward half of the tail;
an aft horseshoe assembly comprising a first aft u-shaped bracket, a second aft u-shaped bracket, at least one aft support brace, the at least one aft support brace connecting the first aft u-shaped bracket and the second aft u-shaped bracket such that the first aft u-shaped bracket and the second aft u-shaped bracket form a half of an ellipse that can slip on the aft half of the tail and the ruddervator;
a L-shaped locator for vertically locating and aligning the forward horseshoe assembly on the tail, the locator perpendicularly extending from the first forward u-shaped bracket;
a connecting assembly that can connect the forward horseshoe assembly and the aft horseshoe assembly when each is placed over the tail and the ruddervator;
a load applicator for applying loads on the ruddervator, the load applicator attached to the aft horseshoe assembly; and
a measuring device for measuring the deflections of the ruddervator being tested, the measuring device attached to the forward horseshoe assembly.

* * * * *